(12) United States Patent
Weiner et al.

(10) Patent No.: US 11,979,645 B1
(45) Date of Patent: May 7, 2024

(54) DYNAMIC CODE INTEGRATION WITHIN NETWORK-DELIVERED MEDIA

(71) Applicant: GumGum, Inc., Santa Monica, CA (US)

(72) Inventors: Ken Weiner, Los Angeles, CA (US); Jagadish Kamath, Karnataka (IN)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 18/051,688

(22) Filed: Nov. 1, 2022

(51) Int. Cl.
*H04N 21/854* (2011.01)
*H04N 21/222* (2011.01)
*H04N 21/81* (2011.01)
*H04N 21/845* (2011.01)

(52) U.S. Cl.
CPC ......... *H04N 21/854* (2013.01); *H04N 21/222* (2013.01); *H04N 21/812* (2013.01); *H04N 21/8146* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 9,292,859 B1* | 3/2016 | Sivertsen | | H04N 21/858 |
| 2013/0194437 A1* | 8/2013 | Osman | | H04N 21/41407 |
| | | | | 348/207.1 |
| 2016/0078335 A1* | 3/2016 | Annamalai | | G06T 11/60 |
| | | | | 382/284 |
| 2016/0247423 A1* | 8/2016 | Hohl | | H04N 21/812 |
| 2016/0277793 A1* | 9/2016 | Eyer | | H04H 60/73 |
| 2018/0131976 A1* | 5/2018 | Zabelin | | H04N 21/812 |
| 2019/0075371 A1* | 3/2019 | Parampath | | H04N 21/25891 |
| 2019/0238954 A1* | 8/2019 | Dawson | | H04N 1/00177 |
| 2019/0259124 A1* | 8/2019 | Barnett | | H04N 21/2365 |
| 2019/0373337 A1* | 12/2019 | Martell | | H04N 21/475 |
| 2020/0108316 A1* | 4/2020 | Nay | | H04N 21/23424 |
| 2021/0400296 A1 | 12/2021 | Hoarty et al. | | |

* cited by examiner

*Primary Examiner* — Alexander Q Huerta
(74) *Attorney, Agent, or Firm* — Knobbe, Martens, Olson & Bear, LLP

(57) ABSTRACT

Systems and methods are described for dynamically generating a graphical code that is placed within an advertisement, which may in in turn be placed dynamically over video or image content delivered to a client device. A portion of a stored advertisement unit may be created to have a color-coded section designated to be later replaced with a graphical code. When a user requests to view image or video content on or in which a given advertisement will be shown, a server may generate a tag that contains a URI that includes tracking parameters to identify what advertisement was scanned and/or other data associated with the advertisement, a publisher, or a client device. A graphical code may be generated to represent the given URI, then that graphical code may be inserted into a previously color-coded area of an ad creative before delivery to a client device for presentation.

20 Claims, 6 Drawing Sheets

DYNAMIC CODE INTEGRATION WITHIN NETWORK-DELIVERED MEDIA

BACKGROUND

There are a variety of approaches and formats for streaming video content over a network, such as the Internet. For example, two common formats for video streaming are HTTP Live Streaming (HLS) and Dynamic Adaptive Streaming over HTTP (DASH). These and other streaming video approaches often involve storing video content on a server or content delivery network (CDN) in a number of small segments or chunks, such as segments having a playback length between two to ten seconds, depending on the implementation used in a given instance. A manifest file (sometimes referred to as simply a manifest) describes the chunks or segments available for streaming from a given source, including location information such as uniform resource locators (URLs), and may include information regarding various audio and video qualities available (e.g. different resolutions, bitrates, etc.). Different manifest or index data may be associated with different video encoding or bitrates, such that a video player may switch between chunks of different quality depending on bandwidth and/or other considerations during video playback.

Steaming video may be presented with inserted advertisements, such as using Dynamic Ad Insertion (DAI) techniques. Video ads for insertion within a content stream may be delivered to a client device separately from delivery of the base content, with the client-side player handling proper timing and insertion into the video playback, or the video ads may be integrated into the video stream on the server side using server-side ad insertion (SSAI) techniques. SSAI, which may in whole or in part be referred to as ad stitching in some contexts, often involves a combination of manifest manipulation, ad server communication, and ad bitrate and resolution normalization, which all would typically happen on the server side before presenting a manifest to a client device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
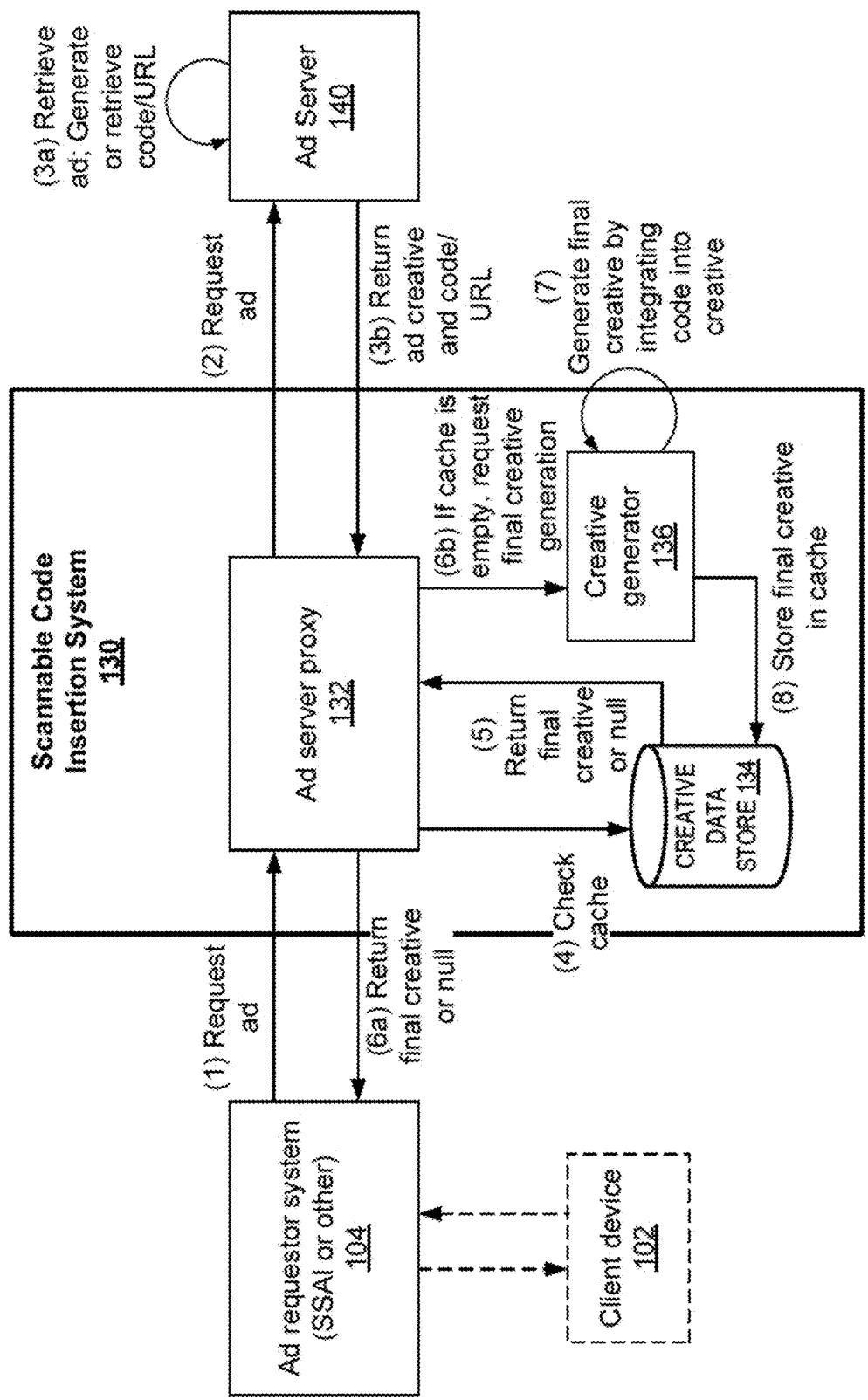
FIG. 1A is a system diagram illustrating data flow for implementing aspects of the scannable code insertion system of the present disclosure, according to some embodiments.

Aspects of the present disclosure relate to dynamically creating quick response ("QR") codes or other graphical or scannable codes (such as other two-dimensional barcodes or Data Matrix codes) that are placed within advertisements that are in turn placed dynamically over video or image content delivered to a client device for playback or presentation. For example, a certain portion of a stored advertisement unit (as image or video content) may be created to have a color-coded section to be replaced, similar to a green screen used in association with chroma key compositing, where a dynamic QR code may be swapped in automatically by a computing system at a later time. When a user requests to view image or video content on or in which the ad will be shown, a server may generate a tag that contains a dynamic "scan URL" or uniform resource identifier (URI) that contains tracking parameters to identify what ad was scanned and on what publisher page or content the scan occurred. A QR code may be generated to represent the scan URL/URI, then that QR code (whether static or animated) may be inserted on a frame-by-frame basis within the ad unit (into the previously color-coded area). In some embodiments, the combined ad unit and QR code may then be integrated over a portion of original video before the combined revised frames are delivered for playback to the user device, such as using SSAI techniques.

In some embodiments, aspects of the present disclosure include server-side manipulation of an underlying video content (such as a show, movie, or a live stream that a user is watching) in order to dynamically place an overlay advertisement or other advertisement content within the video stream in a manner whereby a user sees the advertisement content over or integrated within a portion of the base video content (such as within a bottom third of the screen or other subsection of the display) without a pause or commercial break in playback of the base content, where such advertisement content may include a scannable QR code or other graphical code within a portion of the advertisement content. From the perspective of the client device that presents the video stream in such embodiments, the stream appears to be a single video stream similar to how the client device would process streaming video that does not include an advertisement. Accordingly, whether or not there is click-through functionality in the advertisement portion of the video presentation, a user may learn more about an advertised product or service by capturing an image of the QR code or other graphical code with a mobile device or other camera-including device that is configured to convert such graphical codes into a corresponding URL that the device may then access (such as by loading a corresponding advertisement landing page via a browser or other application).

Advantages of the approaches disclosed herein, including SSAI embodiments, to the user include that the user may continue to watch the underlying video content of interest while an advertisement is displayed, rather than need to wait for a full-screen commercial or advertisement to play prior to starting or resuming playback of the underlying video of interest to the user. Advantages to content publishers, advertisers and others include that advertisements or other supplemental content added via server-side insertion approaches disclosed herein may be technically challenging for client-side software or browser extensions (such as "ad blockers") to recognize and block from playback. For example, an overlay advertisement that is added over playback of underlying video content on the client side may be blocked in a number of manners by simply not displaying the separate overlay content, whereas techniques described herein in accordance with some embodiments may result in overlay content that is incorporated within the individual video frames on the server side (e.g., modifying or replacing actual pixel data of the base video content prior to delivery of the video content to the client device).

In some embodiments, a video publisher, such as a company that wants to offer ad-supported streaming video content to viewing users, may establish a relationship with an SSAI platform and/or scannable code insertion system 402 described herein in order to dynamically insert advertisements within the publisher's video content. The video content may be presented to end-users or viewers via a video player that plays videos on a client device. The player may be provided within a web browser, a mobile application operating on a smartphone or tablet, a connected TV, and/or other over-the-top (OTT) or video playback environment. The video content that a user views via a video player may be supplied to the client device over a network, such as the Internet, as a HLS or DASH manifest URL or file, in some embodiments.

While advertisements (ads) are often used as an example herein, it will be appreciated that any supplemental image, text or video content could be integrated within frames of original video segments or as an overlay over an image or media item according to methods described herein. For example, the overlay content or other supplemental content could be informational as opposed to promotional, although it will be described herein as advertisement content or derived from what is referred to as an advertisement package from an ad server herein.

Figure 1B:
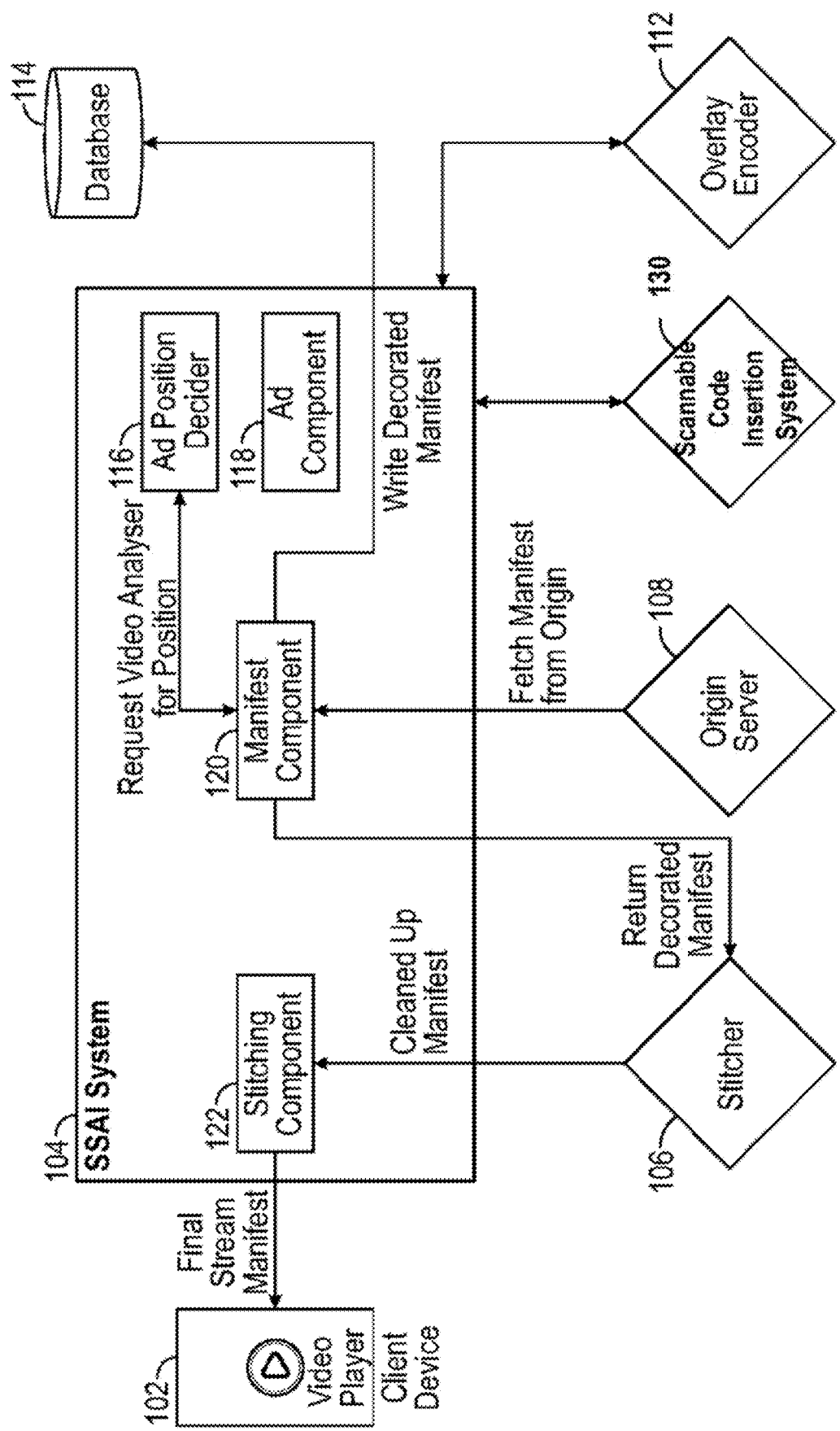
FIG. 1B is a system diagram illustrating data flow implemented by an SSAI system according to some embodiments in which the ad requestor communicating with the scannable code insertion system is an SSAI system that incorporates a final creative (including a graphical code) within frames of an underlying video.

FIGS. 1A and 1B are system diagrams illustrating data flow for implementing aspects of the present disclosure, according to some embodiments. As illustrated, the data flow shown in FIG. 1A may begin with the scannable code insertion system 130 receiving an ad request as step (1) from an ad requestor system 104. In some embodiments, the ad requestor system 104 that sends the ad request to the scannable code insertion system 130 may be a client device (such as a computing device operated by a user who will view an eventual advertisement). In other embodiments, the ad requestor 104 may be an SSAI system (as will be described with reference to FIG. 1B below) that receives an ad request from a client device 102 and then works in cooperation with the scannable code insertion system 130 in generating responsive advertisement content for display on the client device 102. Such embodiments may include those in which the final creative generated by the scannable code insertion system 130 is then integrated or incorporated using SSAI techniques within portions of individual frames of an underlying video watched by the user of the client device 102. In other embodiments in which the ad requestor 104 is a client device (e.g., where no SSAI system is employed and instead the final creative is presented over an image or elsewhere on a publisher page or other user interface presented on ad requestor 104 as a client device), there may be no separate client device 102 in the illustrative data flow of FIG. 1A (and FIG. 1B may not be implemented).

The client device 102 may be, for example, a desktop computer, laptop computer, smartphone, tablet device, or other computing device operated by a user. The user may want to view streaming video content on a video player operating on the client device 102, which may send a stream manifest request to an SSAI system 104. In other embodiments, the ad request from the client device 102 may be initiated by code of a publisher's page or application user interface viewed on the client device that causes the client device to request an advertisement from the scannable code insertion system 130 for incorporation into the page, over an image, over or within a video, or in some other manner of presentation. The request may be over a network, such as the Internet.

In embodiments in which a client device presents a video, rather than an image or other non-video media, it will be appreciated that a video player may be implemented within a web browser, may be a stand-alone video player application (such as operating on a mobile phone, tablet computer or other personal computer), may be a proprietary application of a particular third-party publisher or video platform, may be implemented within a television, and/or other application. In embodiments in which the ad requestor system 104 is an SSAI system, it will be appreciated that an SSAI system may be an Internet-accessible server, service, system or platform that provides advertisement integration within videos across a wide variety of video publishers. For example, the client device 102 may be presenting a webpage of a first publisher to the user of the device that includes an embedded video player that is requesting to load streaming content identified by a given stream manifest referenced in code associated with the page.

Referred back to step (1) of FIG. 1A, the ad request may be received by the ad server proxy 132 of the scannable code insertion system 130. The ad server proxy 132 may in turn at step (2) send an ad request to an ad (advertisement) server or service 140. In some embodiments, the content of the ad request at each of steps (1) and (2) may include various content originally originating from the client device, such as cookie data, client device information, demographic data, browser data, information regarding an underlying page being viewed or media (e.g., video or image in which the ad will be incorporated) being viewed on the client device, and/or other data or information known in the field of online advertisements as being relevant to ad selection or ad targeting by an ad service. The ad server or service 140 may be operated either by the same entity that operates the scannable code insertion system 130 or by a third-party entity, such as an ad network that dynamically matches ad requests associated with a large number of content publishers with advertisements from a potentially large number of different advertisers, using any of various ad selection methods known in the art.

In some embodiments, the ad server proxy 132 may supplement the information in the ad request received at step (1) by including flags or information in the ad request sent at step (2) that indicates to the ad server 140 that the scannable code insertion system 130 is configured to process ad packages that are intended for integration of a QR code or other graphical and/or scannable code before return of the ad to a client device. For example, the ad server 140 may be configured to not send such ad packages in response to ad requests received from systems that may incorrectly display the corresponding ad creative as an image or video that includes a chroma-keyed placeholder portion (e.g., displaying to a user a green rectangle intended by the creator of the ad to be replaced with a dynamic QR code prior to presentation to a user).

At step (3a) of FIG. 1A, the ad server 140 may select and retrieve an ad to present on the client device in the given instance (such as using known techniques for processing ad bids, keyword bids, contextual targeting, demographic targeting, and/or other ad selection approaches), and generate or retrieve the corresponding code/data for subsequent generation of a graphical code to be presented within the ad. For example, ad data for a given advertisement stored by the ad server 140 may include media that is considered the creative associated with the advertisement (which may include, as some examples, a static image, an animated image file, or a video file). The media file(s) for the selected advertisement may be stored by the ad server, or the ad server may store a reference URL indicating a network location (such as a URL referencing one or more file stored by a CDN) of such media file(s).

In some embodiments, the advertisement package data may be in the video ad serving template ("VAST") format. As is known in the art, VAST provides a template for structuring ad tags that serve ads to video players. Using an XML schema, VAST transfers various relevant metadata about an ad from an ad server to a video player, such as information regarding which ad to play, how the ad should appear, how long the ad should last, whether users are able to skip the ad, and/or other information or player instructions. In some embodiments in which the VAST format is used by the ad server, the ad server may return the URL to be represented as a QR code (this URL may also be referenced herein as a scan URL, which is distinguished from a more common click-through URL associated with an ad) in the existing catch-all "otherAdInteraction" field/parameter of the VAST tag data.

The data retrieved or generated by the ad server in association with the scan URL may include the URL itself as well as optional style parameters. The style parameters may generally indicate how the scannable code insertion system 130 should later generate the QR code (or other scannable/graphical code), how the code should visually appear, and/or how the code should be integrated within the creative. For example, the style parameters may include indications of color, logo, shape, format, and/or other display/visual variations for the scannable code to be subsequently generated to represent the scan URL.

The scan URL itself may be dynamically generated by the ad server to include parameters within the URL indicating various metadata associated with the underlying content on the page or other user interface in which the ad will be shown (e.g., identification of a particular video being watched by the user of the client device, a time marker in the video where the ad will be presented, a publisher of the page being viewed by the user, contextual information regarding the page being viewed, and/or other data) and/or regarding the user, the client device and/or demographic data (e.g., non-personally identifiable data regarding the user of the client device, such as identification of a user group, age group, cohort to which the user belongs, etc.). It will be appreciated that essentially any tracking information of interest to a given publisher, advertiser and/or ad network, a large variety of which is well known in the art, may be included as a parameter in the dynamically generated scan URL. For example, the scan URL may be made up of a base URL identifying an intended landing page for the advertiser when a user scans the eventual QR code, where such base URL may have been previously stored at the ad server in association with the ad creative, followed by a series of parameters. For example, the base URL (such as "http://example.com?ad=abc38") may be dynamically appended by the ad server at step 3(a) with a series of one or more key/value pairs for different parameters, such as "publisher=1234&video=movie25". The scan URL may be generated by the ad server dynamically in association with each ad request based on a previously stored tracking template that identifies the scan URL with placeholder values in the parameters that are then replaced by the ad server with values associated with the specific ad request at step (3a). The ad creative and scan URL (which may collectively be considered an advertisement package) may be returned to the ad server proxy 132 at step (3b) of FIG. 1A, such as in the VAST format.

At step (4), the scannable code insertion system 130 may check its cache, shown as stored in creative data store 134 (which may be local or remote to the scannable code insertion system 130), to determine if the scannable code insertion system 130 has previously encountered the combination of the given creative and QR code data returned from the ad server. For example, the creative data store 134 may store a table, database or other lookup information that associates advertisement package information (including each specific combination of scan URL and display parameters) that the ad proxy server 132 has processed in the past from the ad server with an indication of where the resulting final creative has been stored (e.g., the creative with the integrated QR code that represents the given scan URL and was generated with the given display parameters). In some instances, the table or lookup information may include a status indicator indicating that the given creative is in a queue or in process of being generated by the scannable code insertion system 130 but has not yet been generated.

At step (5), the ad server proxy 132 may receive the result from the lookup operation in creative data store 134 indicating whether the final creative corresponding to the specific ad package (such as the specific combination of creative, scan URL and display parameters) has been previously generated and previously stored by the scannable code insertion system 130 (e.g., in response to a previous ad request originating from the same or different ad requestor or client device as the current ad request). If the corresponding final creative already exists in the creative data store 134, the data flow of FIG. 1A may proceed to return the final creative with embedded/integrated scannable code at step (6a) for either presentation by a client device or for further integration of the final creative into underlying video content (such as using SSAI techniques further described elsewhere herein).

If instead the corresponding final creative does not already exist in the creative data store 134, the data flow of FIG. 1A may proceed to both trigger/request generation of the final creative by the creative generator (step (6b)) and indicate to the ad requestor 104 that no ad is currently available (indicated as the null response option in step (6a)). The indication to the ad requestor that an ad is not currently available may be due to appropriate lead time needed to generate the final creative (e.g., if the given computer hardware or processor capabilities do not allow for near-real time generation of a final creative in the given embodiment). The creative generator may subsequently generate the final creative at step (7) by generating the QR code or other graphical code to represent the provided scan URL with the given display parameters (e.g., a QR code having a color, color gradient and/or animation properties indicated in the display parameters) and incorporating that QR code within the appropriate portion(s) of the creative provided by the ad server. For example, as will be further discussed below, an initial creative 302 provided from an ad server may be supplemented or augmented with a generated QR code 314 that replaces a "green screen" or other chroma key portion 304.

The creative generator 136 may then at step (8) store the final creative with an association to the particular ad package information in creative data store 134 such that it may be retrieved later in responding to subsequent ad requests having the same matching scan URL and display parameters as the given ad package. In some embodiments in which the lead time to generate the final creative is relatively short (e.g., a few seconds or other sufficiently short time given the nature of the content in which the ad will be presented on the client device), the scannable code insertion system 130 may additionally return the just-generated final creative to the ad requestor 104 in response to the ad request that triggered the final creative's generation (step/embodiment not illustrated in FIG. 1A).

In some implementations of FIG. 1A that include integrating the final creative within frames of another video (such as an overlay advertisement, including a QR code, within a movie, show or live streaming video), the data flow of FIG. 1B may be employed by an SSAI system 104 after step (6a) shown in FIG. 1A. The data flow implemented by the SSAI system as shown in FIG. 1B, as well as associated data flows involved in SSAI operations that may be utilized in some embodiments of the present disclosure, are described in more detail in co-owned U.S. Pat. No. 11,356, 746, issued Jun. 7, 2022, entitled "Dynamic Overlay Video Advertisement Insertion" (hereinafter "the '746 Patent"), which is hereby incorporated by reference in its entirety herein. Related techniques for embodiments that utilize an SSAI system to integrate ads in the context of live streaming video (such as by employing a delay service), as opposed to techniques focused on ad integration within on-demand video, may be utilized in some embodiments of the present disclosure and are described in more detail in co-owned U.S. Pat. No. 11,284,130, issued Mar. 22, 2022, entitled "Dynamic Insertion of Content Within Live Streaming Video" (hereinafter "the '130 Patent"), which is hereby incorporated by reference in its entirety herein.

With reference to FIG. 1B, which illustrates further data flow following that described above with respect to FIG. 1A, an original manifest retrieved from an origin server 108 may be processed by a manifest component 120 for decoration or modification. The manifest component 120 may query an ad position decider 116 for an ad position, which may be a timestamp in the video at which an advertisement should be inserted as overlay content or other content integrated within frames of the video. The ad position decider may analyze the video and provide ad positions (such as timestamps or other position information) for the video. The ad positions may be determined based on metadata without analyzing the actual video data itself, or may be include analysis of the video file itself (such as image analysis of individual frames), depending on the embodiment. For example, the ad positions may be based on stored rules (such as time between ads), original manifest information, video content analysis (such as object detection within video frames), analysis of sound in the videos (e.g., to detect a pause in action), and/or other manners. The manifest is then decorated with the ad position information. The decorated manifest is stored in database 114 for future use and also returned to the stitcher 106. The ad positions may be encoded as, for example, to include an event_id and unique_program_id.

The stitching service 106 may then identify when to insert an ad in the video based on the decorations present in the revised manifest. The stitcher may perform a stitching job, as will be further described below, and then return a clean manifest to the stitching component 122, which may in turn return the clean manifest to the client device 102 for playback of the video content by the video player. The stitching component 106 may further rely on an overlay encoder 112 and/or ad component 118 (as further described in the '746 Patent) and the final advertisement data from the scannable code insertion system 130, which may include the final creative that includes a QR code within image or video of the advertisement creative. An example video frame that may be included in final video content referenced in the final stream manifest of the SSAI embodiment shown in FIG. 1B will be discussed further below with reference to FIG. 3C.

Figure 2:
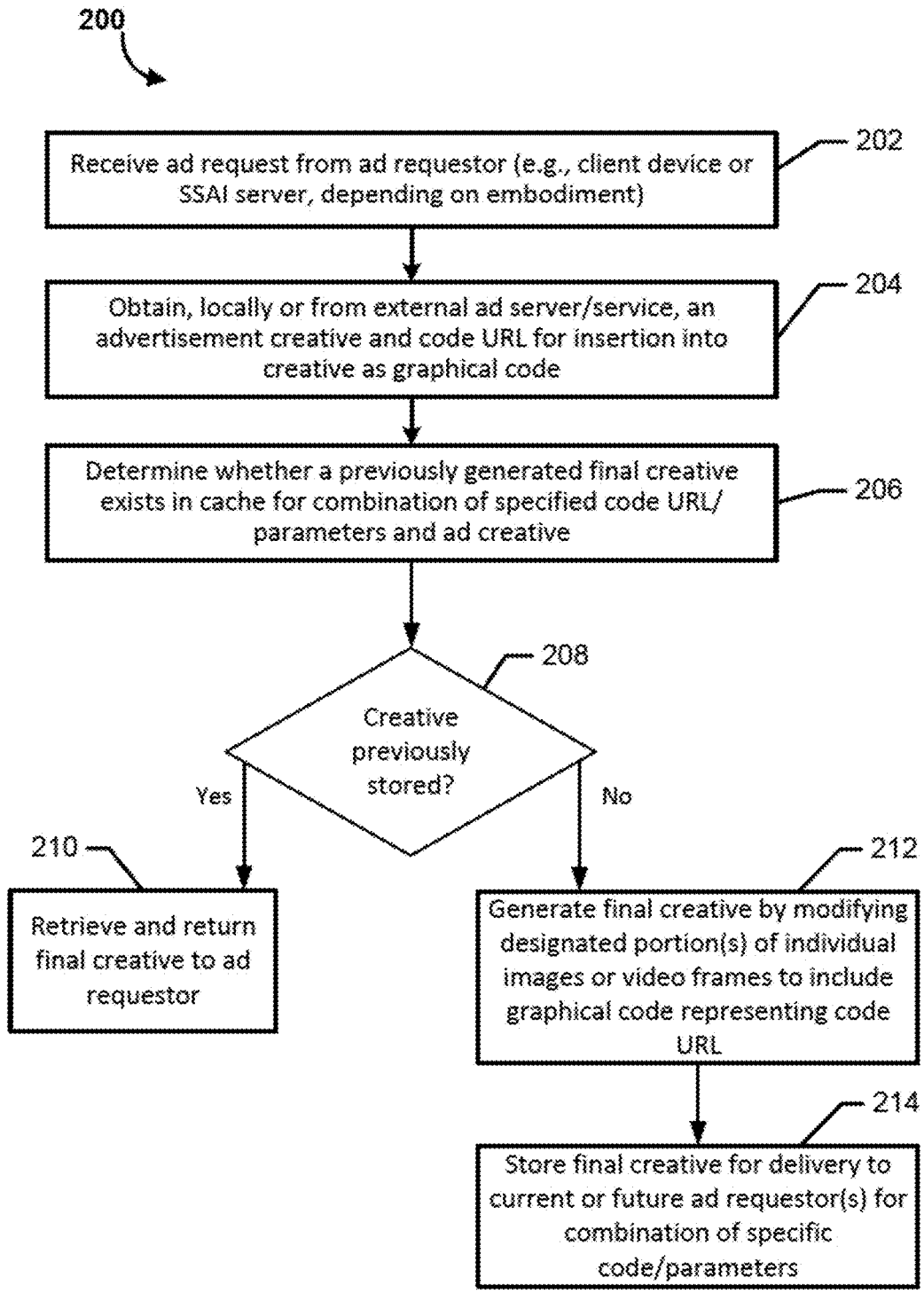
FIG. 2 is a flow diagram of an illustrative method for responding to an advertisement request in which a graphical/scannable code is to be integrated, according to some embodiments.

FIG. 2 is a flow diagram of an illustrative method 200 for responding to an advertisement request in which a graphical/scannable code is to be integrated, according to some embodiments. The illustrative method 200 may be implemented by a server or platform, such as the scannable code insertion system 130 described above, or by a number of computing systems performing different blocks. For ease of description, the blocks will be described below as being performed by the scannable code insertion system 130. Steps similar to the blocks illustrated in FIG. 2 have previously been described above with reference to FIG. 1A and are not in all cases described in as much detail below. Accordingly, the description of FIG. 2 below is intended to be read in combination with the additional details previously described above in order to avoid repetition of feature descriptions and alternatives herein.

The illustrative method 200 begins at block 202, where the scannable code insertion system 130 may receive an ad request from an ad requestor. As discussed above, the request may be from a client device or an SSAI server, depending on the embodiment. In other embodiments, the request may be from some other third-party system that utilizes an operator of the scannable code insertion system 130 for selection or augmentation of ad content, or that the operator of the scannable code insertion system 130 contracts with to add additional advertisement functionality or content prior to return of the final creative to a client device.

At block 204, the scannable code insertion system 130 may obtain, locally or from an external ad server/service, an advertisement creative and code URL for insertion into the creative as a graphical code. As discussed in more detail above, the ad server or ad service (which may be operated by the same or different entity as the scannable code insertion system 130) may select an advertisement from an available set of advertisements, may retrieve an initial creative (e.g., image, video or other media item(s)), dynamically generate an associated scan URL, identify or select graphical code display parameters, and return the resulting ad package (such as utilizing a VAST format) to the scannable code insertion system 130.

Next, at block 206, the scannable code insertion system 130 may determine whether a previously generated final creative exists in cache or a data store for the specific combination of the specified scan URL, display parameters and initial ad creative, as discussed in more detail above. If the decision block 208 results in a determination that the specific final creative was previously generated and stored in cache, the illustrative method 200 may proceed to block 210 to retrieve and return the previously generated final creative to the ad requestor. If instead the decision block 208 results in a determination that the specific final creative has not been previously generated for the given ad package combination, the illustrative method may proceed to block 212.

At block 212, the scannable code insertion system 130 may generate the final creative by modifying one or more designated portion(s) of individual images or video frames of the initial creative to include a graphical code representing the scan URL or other code/data returned by the ad service. Methods for generating a QR code or other graphical code that, when captured by a camera of a device with suitable software for processing the captured image data, will load a given URL represented by the QR code (the scan URL in this case) are well known in the art. The placement of the resulting generated QR code or other scannable code within the ad creative may be based on a placeholder portion of the creative, such as a green square or rectangle made up of pixels of a particular color signifying that the portion should be replaced with the QR code (similar to "green screen" technology or chroma keying methods known in the art). In embodiments in which the creative is animated or includes multiple frames, the QR code may be placed in different in-frame locations between successive frames (e.g., a green or other chroma-keyed rectangle may move in-frame locations between successive frames of the initial creative) and/or be scaled up or down in size between successive frames (e.g., a green or other chroma-keyed rectangle may grow or shrink in size between successive frames of the initial creative).

In other embodiments, chroma key techniques may not necessarily be utilized, and instead the ad server may provide instructions or data accompanying the ad package that indicate how and where the scannable code should be integrated within an initial creative that does not include any in-image or in-video pixel values designating location/size for insertion of the graphical code. For example, the ad server may provide instructions or data indicating that the graphical code should be placed at certain pixel coordinates in the creative with a certain width and height.

At block 214, the scannable code insertion system 130 may store the final creative for delivery to the current and/or future ad requestors for which the specific combination of code/parameters are returned by the ad server, as previously discussed in more detail above.

Figure 3A:
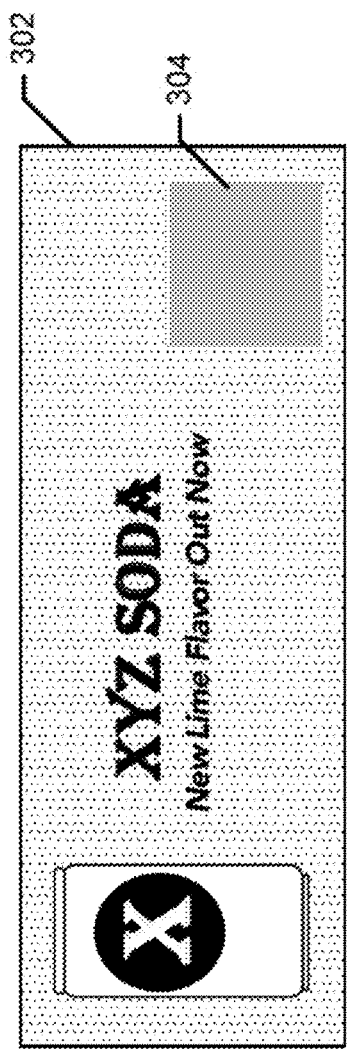
FIG. 3A illustrates a sample advertisement creative prior to a corresponding graphical code being added by the scannable code insertion system described herein.

FIG. 3A illustrates a sample advertisement creative 302 prior to a corresponding graphical code being added by the scannable code insertion system described herein. For example, the creative 302 may be an image file stored by an ad server that includes a chroma-keyed portion 304. The chroma-keyed portion 304 may be, for example, a square portion of the image in which the pixels of the square all have the same pixel color value previously designated as a "green screen" or other chroma key-designated color value to be replaced with dynamic content by a computing system.

Figure 3B:
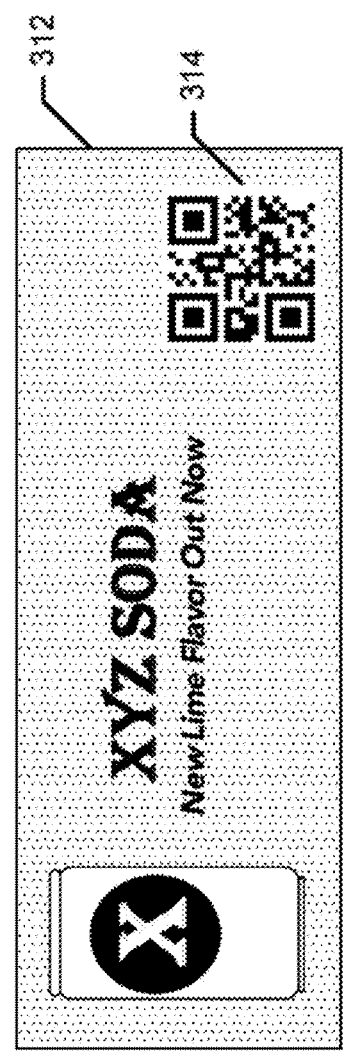
FIG. 3B illustrates the sample advertisement creative of FIG. 3A after a corresponding graphical code has been incorporated therein by the scannable code insertion system.

FIG. 3B illustrates the sample advertisement creative of FIG. 3A after a corresponding graphical code 314 (in this example, a QR code) has been incorporated therein by the scannable code insertion system. The resulting final creative 312 includes the QR code 314 occupying the same square-shaped set of chroma-keyed pixels 304 from initial creative 302. The final creative 312 may be presented to a user on a client device, set-top box, television or other device in a manner in which the user capturing an image of the QR code 314 with a device having camera software that is configured to convert QR codes into a corresponding URL may result in the device accessing a scan URL represented by the QR code 314 (such as by the device loading the scan URL via a browser or other application).

Figure 3C:
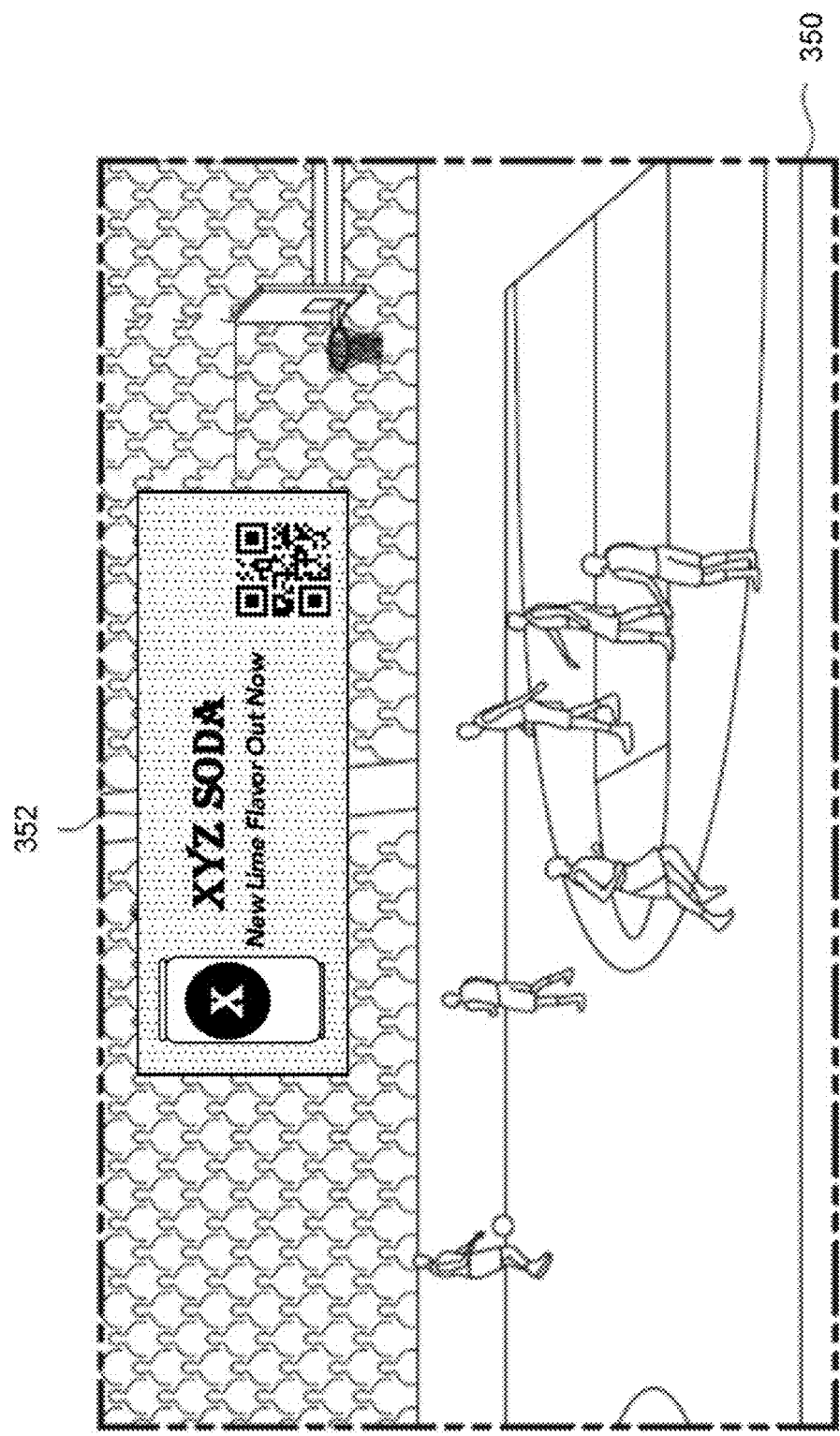
FIG. 3C illustrates a sample video frame of an underlying video in which a final advertisement creative, including a QR code, has been integrated using SSAI techniques, according to some embodiments.

FIG. 3C illustrates a sample video frame 350 of an underlying video in which a final advertisement creative 352, including a QR code, has been integrated using SSAI techniques, according to some embodiments. For example, the video frame 350 may be a frame from a live stream or on-demand recording of a basketball game, on which an ad server selected to place an ad for "XYZ Soda," for which the scannable code insertion system described herein generated a corresponding QR code and final creative 352 that was in turn overlaid over or within a portion of the video using SSAI techniques described above and further described in the '746 Patent and the '130 Patent.

Figure 4:
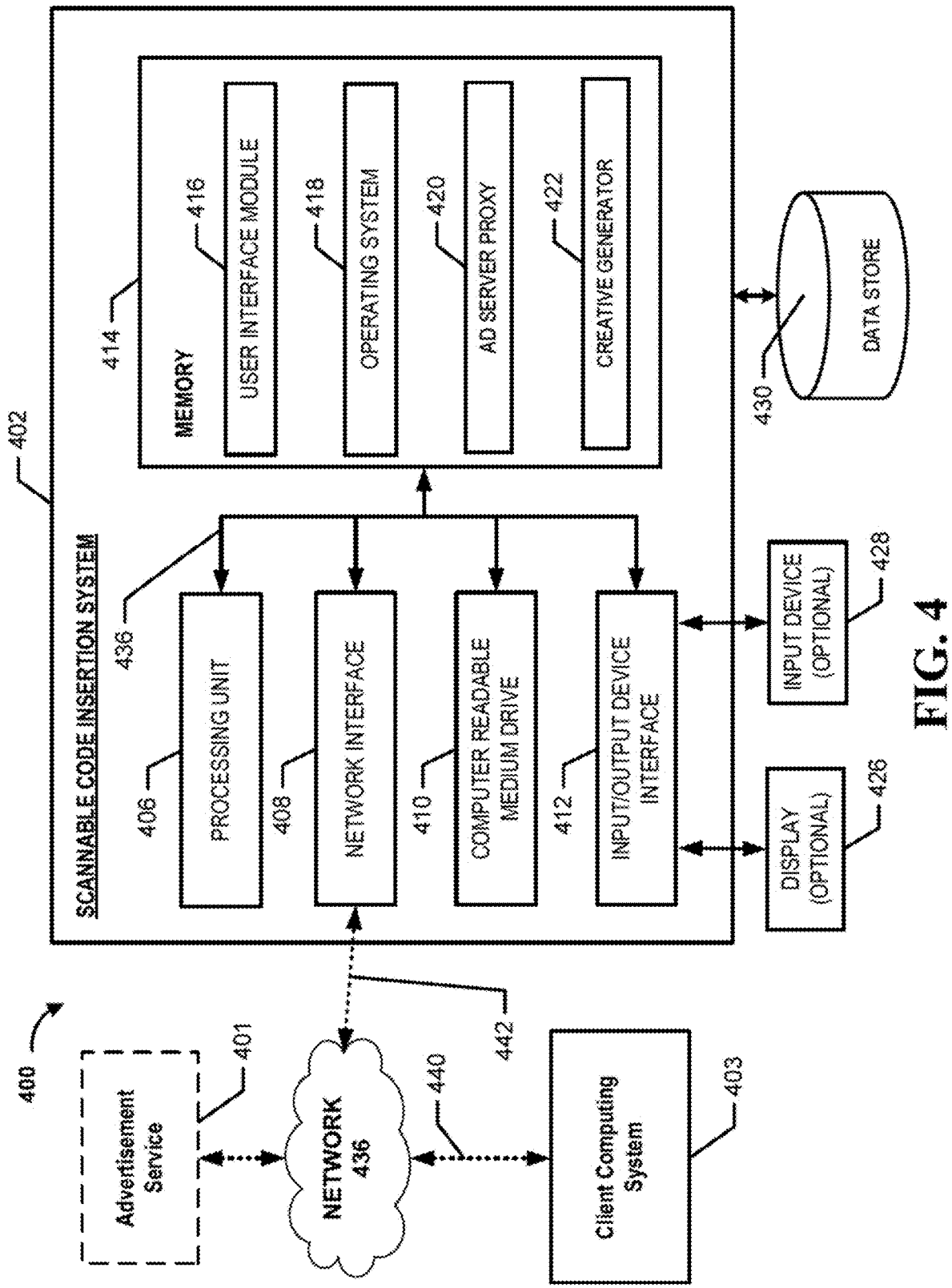
FIG. 4 is a system block diagram of a computing environment suitable for use in various embodiments of the present disclosure.

FIG. 4 illustrates a general architecture of a computing environment 400, according to some embodiments. As depicted in FIG. 4, the computing environment 400 may include a scannable code insertion system 402, which may also be referenced more generally as a computing system 402. The general architecture of the scannable code insertion system or other computing system 402 may include an arrangement of computer hardware and software components used to implement aspects of the present disclosure. The computing system 402 may include many more (or fewer) elements than those shown in FIG. 4. It is not necessary, however, that all of these generally conventional elements be shown in order to provide an enabling disclosure. In some embodiments, the computing system 402 may be one instance of what is referred to above as a computing system or the scannable code insertion system (such as the scannable code insertion system 130). In other embodiments, a computing system similar to that illustrated as system 402 of FIG. 4 may additionally or alternatively be utilized to implement one or more SSAI techniques described above (such as to implement some or all of the methods of the SSAI system 104 described above).

As illustrated, the computing system 402 includes a processing unit 406, a network interface 408, a computer readable medium drive 410, an input/output device interface 412, an optional display 426, and an optional input device 428, all of which may communicate with one another by way of a communication bus 436. The processing unit 406 may communicate to and from memory 414 and may provide output information for the optional display 426 via the input/output device interface 412. The input/output device interface 412 may also accept input from the optional input device 428, such as a keyboard, mouse, digital pen, microphone, touch screen, gesture recognition system, voice recognition system, or other input device known in the art.

The memory 414 may contain computer program instructions (grouped as modules or components in some embodiments) that the processing unit 406 may execute in order to implement one or more embodiments described herein. The memory 414 may generally include RAM, ROM and/or other persistent, auxiliary or non-transitory computer-readable media. The memory 414 may store an operating system 418 that provides computer program instructions for use by the processing unit 406 in the general administration and operation of the computing system 402. The memory 414 may further include computer program instructions and other information for implementing aspects of the present disclosure. For example, in one embodiment, the memory 414 may include a user interface module 416 that generates user interfaces (and/or instructions therefor) for display upon a computing system, e.g., via a navigation interface such as a browser or application installed on the computing system 402 or a client computing system 403.

In some embodiments, the memory 414 may include an ad server proxy 420 and creative generator 422 (which may each be considered different modules or components executed or otherwise implemented by the system 402), which may be executed by the processing unit 406 to perform operations according to various embodiments described herein. The modules 420 and/or 422 may access the data store 430 in order to retrieve data described above and/or store data, such as advertisement packages, QR codes, final creatives, video segments with ad content integrated with original underlying video content, and/or other data. The data store may be part of the computing system 402, remote from the computing system 402, and/or may be a network-based service.

In some embodiments, the network interface 408 may provide connectivity to one or more networks or computing systems, and the processing unit 406 may receive information and instructions from other computing systems or services via one or more networks. In the example illustrated in FIG. 4, the network interface 408 may be in communication with a client computing system 403 via the network 436, such as the Internet. In particular, the computing system 402 may establish a communication link 442 with a network 436 (e.g., using known protocols) in order to send communications to the computing system 403 over the network 436. Similarly, the computing system 403 may send communications to the computing system 402 over the network 436 via a wired or wireless communication link 440. In some embodiments, the computing system 402 may additionally communicate via the network 436 with an optional third-party advertisement service 401, which may be used by the computing system 402 to retrieve advertisement content. Depending on the embodiment, the computing system 402 may be configured to retrieve advertisement data from either data store 430 or third-party advertisement service 401 depending on various information, such as the publisher, advertiser preferences, comparison of ad bid information, and/or other factors.

Those skilled in the art will recognize that the computing systems 402, 102, 130, 140, and/or 104 may be any of a number of computing systems including, but not limited to, a laptop, a personal computer, a smartphone, a wearable computing device, an electronic book reader, a digital media player, a tablet computer, a gaming console or controller, a kiosk, an augmented reality device, another wireless device, a set-top or other television box, one or more servers, and the like. The client computing system 403 may include similar hardware to that illustrated as being included in computing system 402, such as a display, processing unit, network interface, memory, operating system, etc. In some embodiments, the client computing system 403 may perform various steps described herein based in part on a browser or other application operating on the client computing system 403 executing code received over the network from the computing system 402, a publisher server, and/or other network-accessible server or service.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a server, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   one or more processors in communication with the memory and configured to:
   receive, over a network, a first request for an advertisement to be shown on a client device;
   obtain an advertisement package comprising (a) at least one media item, (b) textual data regarding or comprising a code to be visually integrated within the at least one media item as a graphical code, and (c) display parameters for the graphical code, wherein the at least one media item comprises an image or video, wherein a portion of either the image or at least one frame of the video consists of a specific color designating pixels of the portion to be replaced or supplemented with the graphical code;
   determine whether a previously generated final advertisement exists, in an electronic data store, for a combination of the code, the at least one media item and the display parameters for the graphical code;
   based on a determination that the electronic data store does not include any previously generated final advertisement for the combination:
      generate, based on the display parameters and the textual data regarding or comprising the code, the graphical code as a two-dimensional graphical code representing a uniform resource identifier, such that capture of the graphical code by a camera configured by software to interpret two-dimensional graphical codes configures a computing device operating the software to direct a browser or application to access the uniform resource identifier;
      generate a final advertisement by modifying at least the portion of either the image or the at least one frame of the video to visually include the graphical code rather than the specific color that designated pixels of the portion to be replaced or supplemented; and
   store, in the electronic data store, the final advertisement for subsequent delivery to at least one of (a) the client device or (b) a second client device for which the combination of the code, the at least one media item and the display parameters is subsequently selected for presentation.

2. The computer system of claim 1, wherein the at least one media item is video content comprising a plurality of frames, wherein generating the final advertisement comprising modifying each of the plurality of frames to include the graphical code.

3. The computer system of claim 2, wherein an in-frame position of the graphical code is different between two or more individual frames of the final advertisement based on a change in positioning of pixels of the specific color between corresponding individual frames of the at least one media item.

4. The computer system of claim 2, wherein a display size of the graphical code is different between two or more individual frames of the final advertisement based on a change in how many pixels of the specific color are grouped together between corresponding individual frames of the at least one media item.

5. The computer system of claim 1, wherein the graphical code is a QR code.

6. The computer system of claim 1, wherein the advertisement package is obtained over a network from an advertisement server, wherein the advertisement server selects the code and corresponding media item of the advertisement package based at least in part on information received by the computer system regarding the client device.

7. The computer system of claim 1, wherein the one or more processors are further configured to:

retrieve one or more original video segments from a video in which to insert the final advertisement as overlay content; and generate one or more replacement segments of the video, wherein the one or more replacement segments depict at least portions of video content from the final advertisement overlaid over video content from the one or more original video segments, such that a plurality of individual video frames within the one or more replacement segments each depict both advertisement content and portions of corresponding original frames of the video, wherein the advertisement content includes depiction of the graphical code.

8. The computer system of claim 7, wherein the one or more processors are further configured to:

generate a revised manifest file that includes references to the replacement segments instead of corresponding original segments of the video; and send, over the network, the revised manifest file to the client device for presentation of streaming video by the client device in accordance with the revised manifest file, such that the client device presents the graphical code and other content of the final advertisement within portions of each of a plurality of frames of the streaming video.

9. The computer system of claim 7, wherein generating the one or more replacement segments of the video comprises, for each of a plurality of individual frames within the one or more original video segments, replacing some but not all pixels in the individual frame with pixels of the final advertisement.

10. The computer system of claim 1, wherein the one or more processors are further configured to send the final advertisement to the client device for presentation on a page presented by a browser operating on the client device, wherein code of the page caused the client device to send the first request to the computer system.

11. The computer system of claim 10, wherein the uniform resource identifier represented by the graphical code includes identification of a publisher of the page.

12. The computer system of claim 1, wherein the one or more processors are further configured to:

receive a second advertisement request originating from a second client device;

obtain the advertisement package; and based on a determination that the electronic data store includes the final advertisement associated with the advertisement package's combination of the code, the at least one media item and the display parameters for the graphical code:

send the final advertisement to the second client device for presentation by the second client device.

13. A computer-implemented method comprising:

receiving, over a network, a first request for an advertisement to be shown on a client device;

obtaining an advertisement package comprising (a) at least one media item and (b) textual data regarding or comprising a code to be visually integrated within the at least one media item as a graphical code, wherein the at least one media item comprises an image or video, wherein a portion of either the image or at least one frame of the video consists of a specific color designating pixels of the portion to be replaced or supplemented with the graphical code;

determining whether a previously generated final advertisement exists, in an electronic data store, for a combination of the code and the at least one media item;

based on a determination that the electronic data store does not include any previously generated final advertisement for the combination:

generating, based at least in part on the textual data regarding or comprising the code, the graphical code as a two-dimensional graphical code representing a uniform resource identifier, such that capture of the graphical code by a camera configured by software to interpret two-dimensional graphical codes configures a computing device operating the software to direct a browser or application to access the uniform resource identifier;

generating a final advertisement by modifying at least the portion of either the image or the at least one frame of the video to visually include the graphical code rather than the specific color that designated pixels of the portion to be replaced or supplemented; and storing, in the electronic data store, the final advertisement for subsequent delivery to at least one of (a) the client device or (b) a second client device for which the combination of the code and the at least one media item is subsequently selected for presentation.

14. The computer-implemented method of claim 13, wherein the uniform resource identifier represented by the graphical code includes information regarding at least one of (a) the client device or (b) a user of the client device.

15. The computer-implemented method of claim 13, wherein the uniform resource identifier represented by the graphical code includes a parameter identifying a cohort to which a user of the client device belongs.

16. The computer-implemented method of claim 13 further comprising:

prior to obtaining the advertisement package, requesting that a third-party advertisement service select particular advertisement content to include in the advertisement package based on information regarding the client device received in the first request, wherein the third party advertisement service generates the textual data regarding or comprising the code to be visually integrated within the at least one media item.

17. The computer-implemented method of claim 13, wherein the graphical code is a two-dimensional barcode.

18. The computer-implemented method of claim 13 further comprising:

receiving a second advertisement request originating from a second client device;

obtaining the advertisement package; and based on a determination that the electronic data store includes the final advertisement associated with the advertisement package's combination of the code and the at least one media item:

sending, in response to the second advertisement request, the final advertisement to the second client device for presentation by the second client device.

19. The computer-implemented method of claim 13 further comprising:

retrieving one or more original video segments from a video in which to insert the final advertisement; and generating one or more replacement segments of the video, wherein the one or more replacement segments depict at least portions of video content from the final advertisement within or overlaid over video content from the one or more original video segments, such that a plurality of individual video frames within the one or more replacement segments each depict both advertisement content and portions of corresponding original frames of the video, wherein the advertisement content includes depiction of the graphical code.

20. The computer-implemented method of claim 13 further comprising sending the final advertisement to the client device for presentation on a page presented by a browser operating on the client device, wherein code of the page caused the client device to send the first request to the computer system.

\* \* \* \* \*